(12) United States Patent
Yeung et al.

(10) Patent No.: US 11,715,092 B2
(45) Date of Patent: Aug. 1, 2023

(54) TRANSFERRING OWNERSHIP OF PHYSICAL OBJECTS AND DIGITAL COUNTERPARTS USING A DISTRIBUTED LEDGER AND DIGITAL TOKENS ON PHYSICAL OBJECTS

(71) Applicant: Disney Enterprises, Inc., Burbank, CA (US)

(72) Inventors: Jason A. Yeung, Glendale, CA (US); Clifford Wong, Burbank, CA (US); Elliott H. Baumbach, Porter Ranch, CA (US); Michael P. Goslin, Sherman Oaks, CA (US); Tritia V. Medrano, Rowland Heights, CA (US); Nathan D. Nocon, Valencia, CA (US); Stephen A. Thornton, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/714,394

(22) Filed: Dec. 13, 2019

(65) Prior Publication Data

US 2021/0182832 A1 Jun. 17, 2021

(51) Int. Cl.
*G06Q 20/32* (2012.01)
*G06Q 20/06* (2012.01)
*G06Q 20/36* (2012.01)

(52) U.S. Cl.
CPC ..... *G06Q 20/3278* (2013.01); *G06Q 20/0658* (2013.01); *G06Q 20/3678* (2013.01)

(58) Field of Classification Search
CPC ............... G06Q 20/3278; G06Q 20/322
See application file for complete search history.

(56) References Cited

U.S. PATENT DOCUMENTS

| | | | |
|---|---|---|---|
| 10,518,178 B1 * | 12/2019 | Cunningham | H04L 9/3239 |
| 2005/0081135 A1 * | 4/2005 | Kindberg | G06Q 10/10 715/205 |
| 2006/0173789 A1 * | 8/2006 | Baumert | G06F 21/10 705/59 |
| 2011/0098092 A1 * | 4/2011 | Reiche, III | A63F 13/235 463/30 |
| 2012/0291140 A1 * | 11/2012 | Robert | H04N 21/2541 726/28 |

(Continued)

FOREIGN PATENT DOCUMENTS

WO WO2018/235435 A1 * 12/2018

*Primary Examiner* — Eric T Wong
(74) *Attorney, Agent, or Firm* — Patterson + Sheridan, LLP (57) ABSTRACT

Embodiments provide for managing ownership of physical objects and digital counterparts using a distributed ledger and tokens stored on the physical objects. An example method generally includes reading, via a wireless data connection between a physical object and a mobile device, a token stored on the physical object. The token may include at least a unique identifier of the physical object. A request to transfer ownership of the physical object to an owner of the mobile device is generated, and the request may include at least the unique identifier of the physical object. The generated request is transmitted to a distributed ledger system, and a response is received from the distributed ledger system indicating whether the transfer was successful. The indication of whether the transfer was successful is displayed on the mobile device.

18 Claims, 7 Drawing Sheets

(56) References Cited

U.S. PATENT DOCUMENTS

| | | | | |
|---|---|---|---|---|
| 2016/0334994 | A1* | 11/2016 | Yokota | A63F 13/235 |
| 2016/0358239 | A1* | 12/2016 | Inagaki | A63F 13/825 |
| 2019/0199518 | A1* | 6/2019 | Rady | H04L 9/0866 |
| 2019/0205894 | A1* | 7/2019 | Gonzales, Jr. | H04L 9/3247 |
| 2019/0394026 | A1* | 12/2019 | Bookman | H04L 9/50 |
| 2020/0184041 | A1* | 6/2020 | Andon | A63F 13/71 |
| 2021/0103938 | A1* | 4/2021 | Bulawski | G06K 19/0723 |

* cited by examiner

TRANSFERRING OWNERSHIP OF PHYSICAL OBJECTS AND DIGITAL COUNTERPARTS USING A DISTRIBUTED LEDGER AND DIGITAL TOKENS ON PHYSICAL OBJECTS

BACKGROUND

Field

Aspects of the present disclosure relates to distributed ledger systems, and more specifically to tracking ownership of physical objects using tokens read from physical objects in a distributed ledger system.

Description of the Related Art

Distributed ledgers, such as blockchains, hash chains, and other ledger systems, generally provide mechanisms for tracking a transaction history of an object. A distributed ledger may structure a transaction history for an object as a plurality of nodes ordered sequentially. An original transaction in the distributed ledger, representing the creation of the object, may be a node that does not point to any other node in the distributed ledger as a predecessor node. Subsequent transactions may be reached by traversing pointers from the node representing the original transaction to a node representing any specific transaction. Using the distributed ledger, transactions may be processed by ensuring that the object identified in a transaction exists in the distributed ledger (e.g., to verify that an object exists and/or is a valid object against which transactions may occur) and to ensure that the participants in a transaction are entitled to perform the transaction.

Various types of transactions may be recorded in a distributed ledger. Transactions involving digital objects may be recorded using information embedded in the digital object or derived from a digital object. For example, when a transaction is performed in respect of a digital object, a node in the distributed ledger may be generated based on the parties performing the transaction on the digital object and information extracted or derived from the digital object. However, maintaining a distributed ledger for physical objects may be a more complicated process for a variety of reasons. For example, some physical objects may not have a unique identifier associated with each copy of the physical object. That is, while these objects may be associated with a unique code, such as a Universal Product Code (UPC), there may not be a mechanism that allows for one of these objects to be distinguished from another of these objects. In another example, where physical objects have a unique identifier, such as a unique serial number, recording transactions may entail manually entering the unique identifier as part of the transaction, which may be prone to transcription errors that result in transactions being recorded for the wrong physical object.

SUMMARY

One embodiment described herein is a method for managing ownership of physical objects in a distributed ledger by a mobile device. The method generally includes reading, via a wireless data connection between a physical object and a mobile device, a token stored on the physical object. The token may include at least a unique identifier of the physical object. A request to transfer ownership of the physical object to an owner of the mobile device is generated, and the request may include at least the unique identifier of the physical object. The generated request is transmitted to a distributed ledger system, and a response is received from the distributed ledger system indicating whether the transfer was successful. The indication of whether the transfer was successful is displayed on the mobile device.

Another embodiment described herein is a method for managing ownership of physical objects in a distributed ledger. The method generally includes receiving a request to transfer ownership of a physical object from a first party to a second party. A node in the distributed ledger is identified, the identified node representing a latest update to ownership records for the physical object. The owner identified in the identified node is compared with the first party identified in the received request. One or more actions are taken to transfer ownership of the physical object based on the comparing the owner identified in the identified node with the first party identified in the received request.

Certain aspects provide means for, apparatus, and/or computer readable medium having computer executable code stored thereon, for performing the techniques described herein.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure describe distributed ledger systems that manage ownership records associated with physical objects based on information contained in digital tokens on the physical objects. In some embodiments, a user can retrieve information about a physical object from the digital token via a low-power wireless data connection, such as a near field communications (NFC) or Bluetooth® Low Energy (BLE) connection, and generate a request to transfer ownership of the physical object (and optionally, digital counterparts of the physical object) to the user. A distributed ledger system can verify that the current owner of the physical object has consented to transferring ownership of the physical object to the user and can generate records in the distributed ledger evidencing the transfer of ownership or block completion of a transfer if the current owner of the physical object has not consented to transferring ownership of the physical object.

By using information contained in digital tokens on a physical object to generate ownership records and effectuate transfers of ownership of a physical object, embodiments presented herein can generate verifiable chains of ownership for physical objects. Authenticity of an object may be verified based on the existence of an ownership chain for an object identified by information contained in the digital token on a device, thus providing an anti-counterfeiting service for physical objects that may be exchanged between owners. Further, embodiments of the present disclosure may allow for the maintenance and transfer of digital counterparts to physical objects. These digital counterparts may be static objects or dynamic objects that can be changed over time (e.g., during use in a game or other interactive applications in which users can change the appearance or other characteristics of a digital character). Over time, the digital counterpart of a physical object may acquire characteristics that are different from a default set of characteristics, and the modified digital counterpart of the physical object may be traded along with the physical object.

Figure 1:
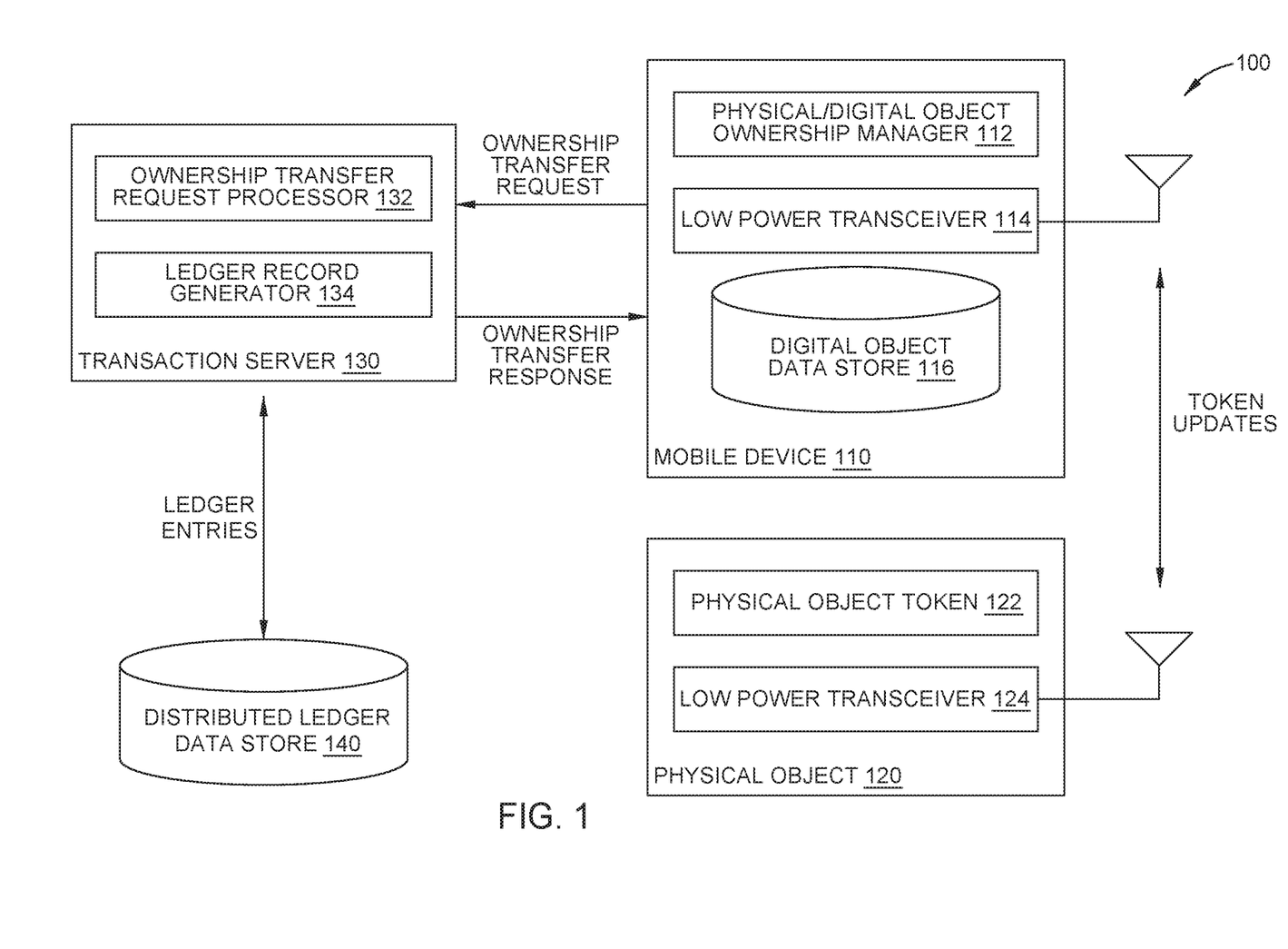
FIG. 1 is a diagram of a networked computing environment in which digital tokens read from a physical object are used to transfer ownership of a physical object and digital counterparts between parties, according to one embodiment described herein.

FIG. 1 illustrates a networked computing environment in which digital tokens stored on a physical object are used by a mobile device to transfer ownership of a physical object (and, in some embodiments, a digital counterpart of the physical object) from one party to another party. As illustrated, computing environment 100 includes a mobile device 110, a physical object 120, a transaction server 130, and a distributed ledger data store 140.

Mobile device 110 is representative of a variety of client devices that may be used to read data from digital tokens on a physical object and generate requests to transfer ownership of a physical object (and, in some embodiments, a digital counterpart of the physical object) from one party to another party. Mobile device 110 may be, for example, a cellular telephone, a smartphone, a tablet, a wearable device, or other appropriate computing device.

As illustrated, mobile device 110 includes a physical/digital object ownership manager 112, a low power transceiver 114, and a digital object data store 116. Physical/digital object ownership manager 112 generally initiates requests to record a transfer of ownership of a physical object 120 from a first party to a second party and handles messages from transaction server 130 received in response to a request to record a transfer of ownership of the physical object 120.

In some embodiments, where mobile device 110 is associated with an owner of physical object 120 (e.g., the owner has logged into the owner's account on mobile device 110 and/or physical/digital object ownership manager 112), the owner of physical object 120 can initiate a request to transfer ownership of the physical object by indicating, to physical/digital object ownership manager 112, the physical object to be transferred and the party to whom the physical object is to be transferred (i.e., a receiving party). The user can indicate the physical object to be transferred by initiating a read operation on physical object token 122 stored on a physical object 120 using a data connection between mobile device 110 and physical object 120 (e.g., between low power transceiver 114 of mobile device 110 and low power transceiver 124 of physical object 120). One or more properties of physical object 120, such as a unique identifier of physical object 120, information about the digital counterpart of physical object 120, and the like, may be extracted from physical object token 122 stored on physical object 120 and included in the request to transfer ownership of physical object 120. The data connection may be, in some embodiments, a low-power wireless connection, such as a Near Field Communications (NFC) connection, a Bluetooth® Low Energy (BLE) connection, an optical data transfer connection (e.g., IrDA), or other low-power wireless data connection. In some embodiments, the user can indicate the physical object 120 to be transferred by identifying the digital counterpart of the physical object 120 in digital object data store 116.

In some embodiments, mobile device 110 may be associated with the receiving party in a transaction. The owner of mobile device 110 may initiate a request to transfer ownership of the physical object by indicating, to physical/digital object ownership manager 112, that the owner of mobile device 110 is to be the receiving party in a transaction. Physical/digital ownership manager 112 can request that the owner of mobile device 110 identify the physical object to be received and the transferring party from whom the ownership of the physical object is to be received. To identify the physical object to be received, physical/digital ownership manager 112 can read physical object token 122 on physical object 120 using a data connection between mobile device 110 and physical object 120 (e.g., between low power transceiver 114 of mobile device 110 and low power transceiver 124 of physical object 120) and extract at least a unique identifier of physical object 120 from physical object token 122.

Mobile device 110 may generate a request to transfer ownership of the physical object 120 and transmit the ownership transfer request to transaction server 130 for processing. In some embodiments, the request may include a node that includes information extracted from physical object 120 and/or digital object data store 116. Generally, the node may include at least a unique identifier read from a token on physical object 120, an identification of the transferring party from whom ownership of physical object 120 is to be transferred and an identification of the receiving party to whom ownership of physical object 120 is to be transferred. The node may additionally include other information that may be used in transferring ownership of physical object 120. For example, the node may include a timestamp indicating when the request was initiated, attributes of physical object 120 read from physical object token 122, attributes of a digital counterpart of physical object 120 stored in digital object data store 116, and the like. The node may be encapsulated as the payload of a request message transferred to a transaction server or other distributed ledger system for processing.

In some embodiments, where the ownership transfer request is received from a mobile device 110 associated with a receiving party, mobile device 110 associated with a transferring party may receive a request to confirm the transfer of ownership of physical object 120. If the transferring party confirms the transfer of ownership of physical object 120, transaction server 130 can process the transaction and effectuate an ownership transfer from the transferring party to the receiving party. Otherwise, as discussed in further detail below, transaction server 130 can block completion of the transfer and generate an error message indicating that the transfer request failed.

In response to transmitting the ownership transfer request to transaction server 130 for processing, mobile device 110 may receive an ownership transfer response indicating whether or not the ownership transfer request was successfully processed. If the ownership transfer request failed, physical/digital object ownership manager 112 may generate and display an error message indicating why the ownership transfer request failed. For example, as discussed below, an ownership transfer request may fail if physical object 120 is counterfeited or otherwise not recognized by transaction server 130. Physical/digital object ownership manager 112 may thus generate and display an error message indicating that physical object 120 is not authentic. In another example, an ownership transfer request may fail if the party attempting to transfer ownership of physical object 120 is not the last recorded owner of physical object 120. Physical/digital object ownership manager 112 may thus generate and display an error message indicating that the transferring party does not actually own physical object 120 and cannot convey ownership of physical object 120 to the receiving party.

If, in response to the ownership transfer request, mobile device 110 receives a response indicating that the ownership transfer request was successfully processed, mobile device 110 may take one or more actions to complete transferring ownership of physical object 120 and, if applicable, the digital counterpart of physical object 120. A mobile device 110 associated with the transferring party may remove the digital counterpart of physical object 120 from a digital object data store 116. Meanwhile, a mobile device 110 associated with the receiving party may add the digital counterpart of physical object 120 to a digital object data store 116. The mobile device 110 associated with the receiving party may receive the digital counterpart of physical object 120 from transaction server 130 or directly from physical object 120. For example, mobile device 110 may cache the digital counterpart of physical object 120 read from physical object token 122 and commit the digital counterpart of physical object 120 to digital object data store 116 when a successful response is received.

In some embodiments, as the attributes of a digital counterpart of physical object 120 changes, physical/digital object ownership manager 112 can initiate write operations to physical object token 122 to update the attributes of the digital counterpart of physical object 120 stored in physical object token 122. For example, in a gaming application, as the digital counterpart of the physical object levels up and obtains and uses in-universe objects, the attributes of the digital counterpart may be saved in digital object data store 116 (or in a remote data store). Periodically or aperiodically, physical/digital object ownership manager 112 can prompt a user of a mobile device 110 to synchronize the digital counterpart stored in digital object data store 116 with physical object token 122 on physical object 120. For example, a synchronization process may be initiated when a user saves the current state of a game or during some other in-universe event (e.g., when the digital counterpart levels up). In some embodiments, a user may be prompted to synchronize digital counterparts with their corresponding physical objects periodically based on a determination of whether a digital object has changed since a previous time at which a digital counterpart has been synchronized with its corresponding physical object.

In some embodiments, a transfer of ownership of physical object 120 (and the corresponding digital counterpart of physical object 120, if any) may be a temporary transfer. For example, in a gaming environment, where physical object 120 is a sculpture or figurine of a playable character in the gaming environment and has a corresponding digital object of the playable character, one user may allow a second user to borrow the figurine and the corresponding digital object so that the second user can use and improve the playable character. To effectuate a temporary transfer of ownership, the request to transfer ownership of physical object 120 (and the corresponding digital counterpart, if any) may include an indication that the transfer is a temporary transaction. The indication that the transfer is a temporary transaction may be, for example, a Boolean flag, a reserved value in a transaction type indicator, or some other value that indicates that the transfer is a temporary transaction. The indication may also include a timestamp indicating a time at which ownership of physical object 120 and the digital counterpart of physical object 120 is to revert to the first user.

When physical object 120 is to be returned (e.g., at the indicated time at which ownership reverts back to the first user from the second user), the mobile device 110 associated with the second user may generate a subsequent request to transfer ownership of the physical object back to the first user. The subsequent request may include attributes of the digital counterpart of the physical object 120 stored in digital object data store 116 so that improvements to the digital counterpart of the physical object (e.g., when a digital character associated with a physical figurine levels up, acquires new skills, etc.) are recorded in the ledger entries associated with the object and propagated to the digital object data store 116 on the mobile device 110 associated with the first user.

Low power transceiver 114 generally allows mobile device 110 to wirelessly communicate with a corresponding low power transceiver 124 on physical object 120 in order to read data from and write data to physical object 120 (e.g., physical object token 122 on physical object 120). Low power transceiver 114 may operate on a variety of communications protocols that allow for data transmissions to be performed over a short distance (e.g., of up to a few metres between mobile device 110 and physical object 120), such as Near Field Communications (NFC) or Bluetooth® Low Energy. Low power transceiver 124 may, in some embodiments, additionally provide power to low power transceiver 124 on physical object 120 to allow for wireless communications between mobile device 110 and physical object 120 without the need for physical object 120 to have its own power source.

Digital object data store 116 generally serves as a repository in which digital counterparts to physical objects 120 owned by the owner of mobile device 110 are stored. Generally, updates to digital counterparts to physical objects 120 may be saved in digital object data store as such updates are performed, and these updates may be propagated to the corresponding physical objects periodically or aperiodically. When ownership of a physical object 120 transfers from a first user to a second user, the digital counterpart of the transferred physical object may be deleted from digital object data store 116 of the mobile device 110 owned by the first user.

Physical object 120 generally represents an object that may be transferred from one user to another user. These objects may be a variety of objects, such as pins, collectible figurines, trading cards, toys, or other objects that may be transferred between different users. These objects may also include items that may be attached to an digital object, such as wearable clothing or other digital objects for a character in a digital environment. In some embodiments, physical object 120 may also be associated with a digital counterpart which may be used in various digital applications on a mobile device 110, such as games, digital wallets, and the like. As illustrated, physical object 120 includes a physical object token 122 and a low power transceiver 124.

Physical object token 122 generally is stored in non-volatile memory on physical object 120 (e.g., flash memory, SRAM, etc.) and includes information about physical object 120 and (if applicable) a digital counterpart of the physical object 120. In some embodiments, physical object token 122 may include information that uniquely identifies the physical object, such as a serial number, a Globally Unique Identifier (GUID), or other unique identifier. Attributes of the physical object may be stored in physical object token 122. These attributes may include other information about the physical object, such as a date of manufacture, a date at which the object as initially conveyed to its first owner, physical characteristics of the physical object, and the like. Further, a representation of the digital counterpart of physical object 120 may be stored in physical object token 122. The representation of the digital counterpart may include, for example, a base (default) appearance of the digital counterpart and modifications to the appearance and characteristics of the digital counterpart that have been performed against the digital counterpart.

Low power transceiver 124 generally allows physical object 120 to communicate with a mobile device 110. As discussed, low power transceiver 124 may communicate with the mobile device 120 using a variety of communications protocols that allow for data transmissions to be performed over a short distance, such as NFC, BLE, and other low-power, short distance communications protocols. Low power transceiver 124 may receive signals from mobile device 120 to retrieve information from physical object token 122 and/or write information to physical object token 122, and in response, low power transceiver 124 may transmit one or more signals to mobile device 110 including the requested information or an acknowledgment that the received information was written to physical object token 122.

Transaction server 130 generally processes requests to transfer ownership of a physical object 120 from a first user to a second user and generates a response to the received requests. As illustrated, transaction server 130 includes an ownership transfer request processor 132 and a ledger record generator 134.

Ownership transfer request processor 132 generally analyzes a received request against information about a physical object 120 in the distributed ledger to determine whether a request to transfer ownership of a physical object can be processed. In some cases, ownership transfer request processor 132 can determine whether a physical object 120 identified in the received request is authentic. Generally, a physical object may be considered authentic if a node including the unique identifier of the physical object included in the request exists in the distributed ledger. If no node in the distributed ledger includes the unique identifier of the physical object included in the request, ownership transfer request processor 132 can determine that the physical object 120 identified in the request is not an authentic object against which transactions can be performed. Based on this determination, ownership transfer request processor 132 can generate an error message and terminate processing of the received request to transfer ownership of the physical object 120.

Otherwise, ownership transfer request processor 132 can proceed to determine whether the transferring party identified in the request is the current owner of the physical object 120 and its corresponding digital counterpart. Generally, the current owner of the physical object 120 may be the only party that can convey ownership of the physical object 120 to another party; previous owners or parties not referenced in any node in the ledger associated with the physical object 120 may not convey ownership of the physical object to any other party. To determine whether the transferring party identified in the request is the current owner of the physical object 120, ownership transfer request processor 132 can identify a node in the distributed ledger representing the latest update to ownership records for the physical object. In some embodiments, ownership transfer request processor 132 can identify the node representing the latest update to the ownership records for the physical object by identifying an origin node in the distributed ledger representing the creation of the physical object and its associated ownership records. From the origin node, ownership transfer request processor 132 can follow pointers between different nodes in the distributed ledger until ownership transfer request processor 132 identifies a node that nodes not include a pointer to any other node in the distributed ledger. In some embodiments, ownership transfer request processor can search distributed ledger data store 140 for information identifying the latest node related to the physical object 120 and can retrieve the identified latest node from distributed ledger data store 140.

Based on a comparison of the owner identified in the latest node associated with the physical object 120 to be transferred and the transferring party identified in the request, ownership transfer request processor 132 can take one or more actions to transfer ownership of the physical object. If the owner identified in the latest node is not the transferring party identified in the request, ownership transfer request processor 132 can determine that the transfer cannot be completed and may generate and transmit an error message to mobile device 110. Otherwise, if the owner identified in the latest node is the transferring party identified in the request, ownership transfer request processor 132 can determine that the transfer may be completed.

Ledger record generator 134 generates nodes to add to a distributed ledger to evidence a transfer of ownership of a physical object 120 from a first party to a second party and adds the generated nodes to the distributed ledger. To generate a node, ledger record generator 134 uses information included in the ownership transfer request to instantiate the node with the unique identifier of the physical object 120, the receiving party as the current owner of the physical object 120, and any attributes of the physical object 120 (e.g., attributes of the digital counterpart of the physical object 120) to be committed to the distributed ledger. Ledger record generator 134 then links the generated node to the last node in the distributed ledger that references the physical object 120, thus evidencing the transfer of ownership of the physical object 120 from a first party (e.g., a transferring party) to a second party (e.g., a receiving party).

In some embodiments, ownership transfer request processor 132 may receive information indicating that a transfer of ownership of the physical object 120 is a temporary transfer of ownership (e.g., a receiving party identified in the ownership transfer request is borrowing physical object 120 from a transferring party for a limited period of time, after which ownership of the physical object 120 reverts back to the transferring party). In such a case, ledger record generator 134 may generate a node in the distributed ledger that includes an indication that the transfer is a temporary transfer of ownership between the transferring and receiving parties. In some embodiments, ownership transfer request processor 132 may set a timer to expire at the identified expiration date of the temporary transaction. When the timer expires, ownership transfer request processor 132 can instruct ledger record generator 134 to generate and attach a new node to the distributed ledger evidencing the return of a borrowed physical object 120 to the transferring party. The new node may include attributes of the digital counterpart of the physical object retrieved from a digital object data store 116 of the mobile device 110 owned by the receiving party.

In some embodiments, when ownership of the physical object 120 is transferred from the transferring party to the receiving party, the digital counterpart of the physical object 120 may be pushed to the mobile device owned by the receiving party for commitment in digital object data store 116. At or after the identified expiration date of the temporary transaction, ownership transfer request processor 132 can retrieve the current attributes of the digital counterpart from the mobile device 110 owned by the receiving party for inclusion in the node evidencing the return of the physical object 120 and the digital counterpart to the transferring party. Ownership transfer request processor 132 can push a number of messages to the mobile devices 110 owned by the transferring and receiving parties. The messages pushed to the mobile device 110 owned by the transferring party may include the digital counterpart of the physical object 120 retrieved from the mobile device 110 owned by the receiving party, which adds the updated digital counterpart back to a repository associated with the transferring party. The messages pushed to the mobile device 110 owned by the receiving party may request that the digital counterpart of the physical object 120 be deleted from the mobile device 110 owned by the receiving party.

In some embodiments, ownership transfer request processor 132 can control a maximum rate at which a physical object 120 and its digital counterpart may be transferred between users. The maximum rate at which an object can be transferred between users may be set so that users are unable to "game" a system to artificially increase the value of a physical object and/or its digital counterparts by appearing to engage in an amount of activity that indicates higher demand for the object than other physical objects tracked in a distributed ledger and/or taking advantage of enhancements to a digital counterpart that occur when an object is traded. To do so, ownership transfer request processor 132 can specify a "cool down" period during which requests to transfer ownership of the physical object 120 may be blocked. The "cool down" period may be defined as a time offset from a timestamp included in a node representing the transfer of ownership of physical object 120

Figure 2:
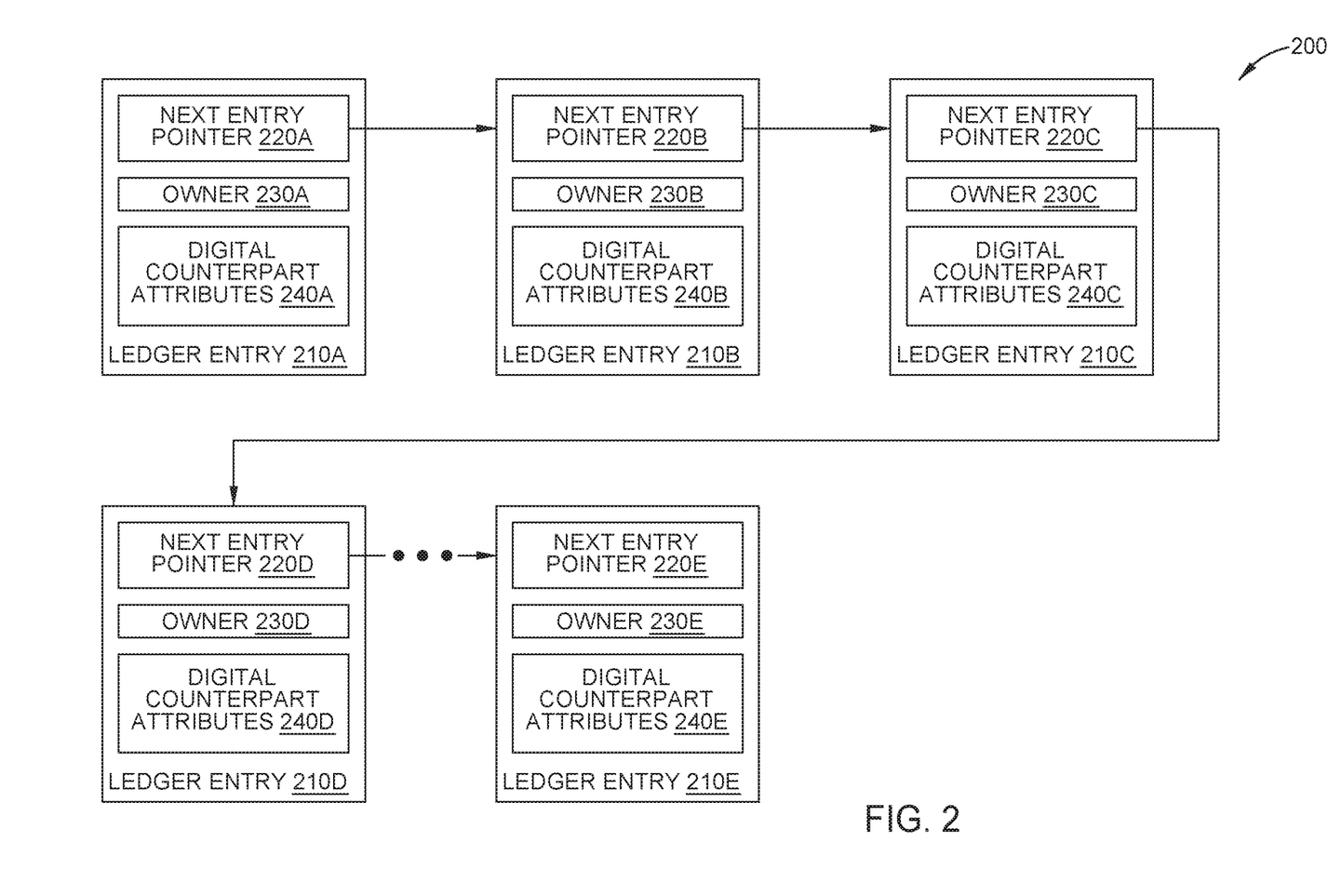
FIG. 2 is a diagram of an example ownership record of a physical object that record changes in ownership of a physical object and attributes of a digital counterpart of the physical object when ownership changes, according to one embodiment described herein.

FIG. 2 illustrates an example record 200 in a distributed ledger showing changes in ownership of a physical object 120 processed by a ledger system (e.g., transaction server 130 illustrated in FIG. 1). As illustrated, record 200 includes a plurality of ledger entries (or nodes) 210A-E, where each ledger entry identifies an owner of the physical object 120 at the time the ledger entry was created.

Ledger entry 210A represents the initial entry in the distributed ledger in respect of a specific physical object 120. Ledger entry 210A may be generated, for example, when a physical object 120 is manufactured, initially sold at a point of sale machine, or otherwise initially registered in the distributed ledger. Subsequent ledger entries may indicate the party to whom the physical object 120 is transferred, along with the digital counterpart to the physical object if one exists. Connections between ledger entries 210 may indicate a transaction, such that a first ledger entry 210 having a pointer to a second ledger entry 210 indicates the owner identified in the first ledger entry has transferred ownership of the physical object to the owner identified in the second ledger entry. As discussed, the last ledger entry 210 in the record 200 (e.g., ledger entry 210E illustrated in FIG. 2) identifies the current owner of the physical object.

Each ledger entry 210 includes a next entry pointer 220, an owner 230, and digital counterpart attributes 240. Next entry pointer 220A references the ledger entry 210 associated with the immediately subsequent owner of the physical object being tracked in record 200 or includes a null pointer if the ledger entry 210 identifies the current owner of the physical object. A reference to another ledger entry 210 may include, for example, a cryptographic hash of a ledger entry, a memory address, or other unique identifier that can be used to find a ledger entry in a distributed ledger (e.g., in distributed ledger data store 140).

Owner 230 generally identifies the current owner of the physical object at the time ledger entry 210 is created. Generally, the current owner of the physical object at the time ledger entry 210 is created may be the party receiving ownership of the physical object from the owner identified in the immediately preceding time ledger entry 210. Owner 230 may be identified, for example, from a username associated with the user (which is presumed unique, as users may not be allowed to share the same username), an email address associated with the user, a unique number, or other information that uniquely identifies an owner of a physical object.

Digital counterpart attributes 240 generally include information about the digital counterpart of a physical object tracked in ledger entries 210. The information may include, for example, a base (or default) configuration of a digital counterpart of a physical object and modifications to the digital counterpart that a user has made to the digital counterpart. These modifications may be, for example, appearance modifications (e.g., different clothing objects displayed on a digital character in a game), changes to an in-universe inventory of objects maintained by the digital character, changes to the capabilities of the digital character relative to a default configuration, and the like.

Figure 3:
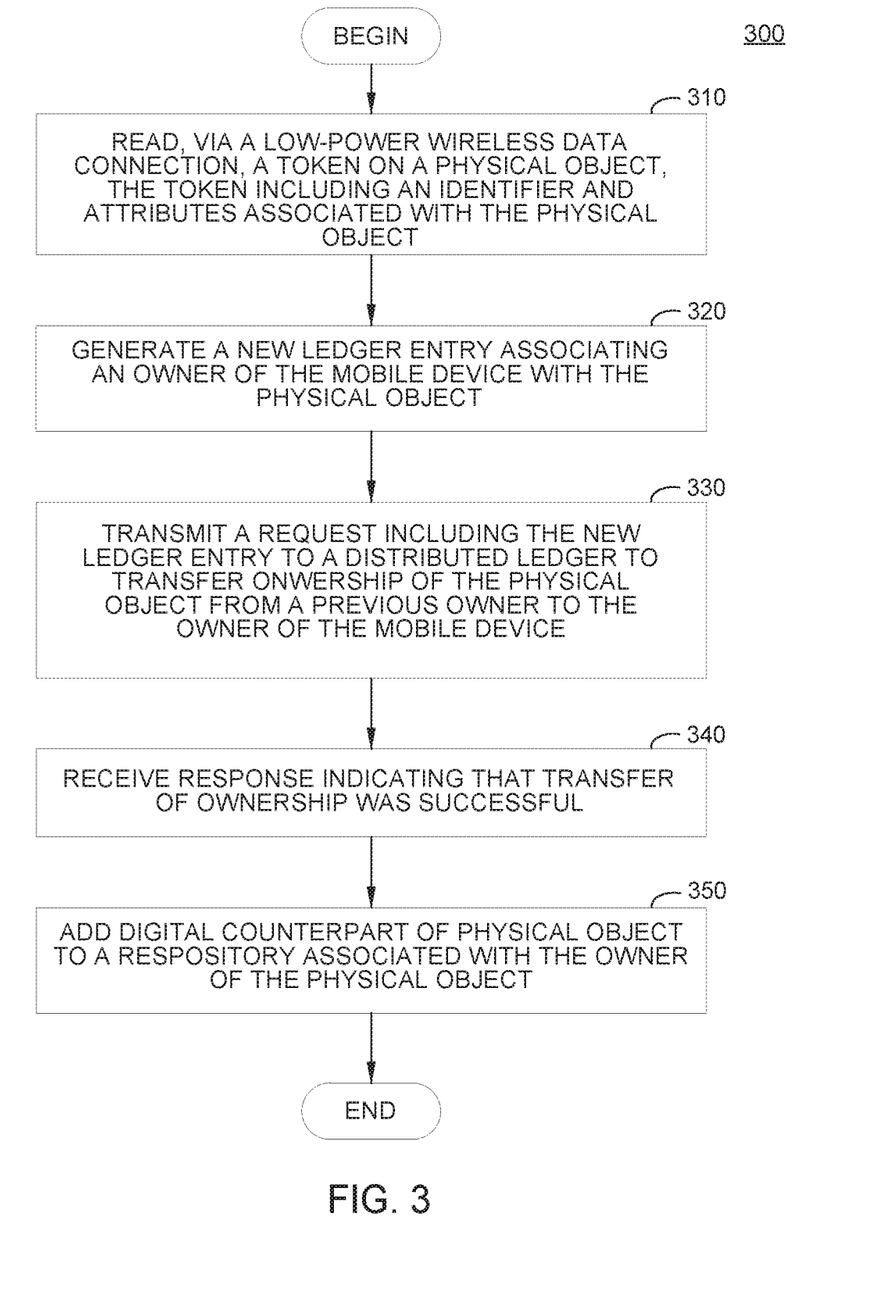
FIG. 3 illustrates example operations for initiating a transfer of ownership of a physical object between parties from a mobile device, according to one embodiment described herein.

FIG. 3 illustrates example operations that may be performed by a mobile device to initiate a transfer of ownership of a physical object to a receiving party. As illustrated, operations 300 begin at block 310, where a mobile device reads, via a low-power wireless data connection, a token on a physical object. The token generally includes an identifier and attributes associated with the physical object to be transferred to a receiving party, such as information about a digital counterpart to the physical object, usage properties of the physical object, and other information that may be stored in a token. In some embodiments, the token may be a distributed ledger token that may be used to generate a request to transfer ownership of the physical object. The token may be read from the physical object, for example, via a Near Field Communication (NFC) connection, a Bluetooth® Low Energy connection, or other low-power wireless data exchange mechanism.

At block 320, the mobile device generates a request to transfer ownership of the physical object from the present owner of the physical object to the owner of the mobile device. The request generally includes the token retrieved from the physical object (or information extracted from the token) and an identifier of the owner of the mobile device as the receiving party in a transaction. The token may include information that identifies the physical object to be transferred and attributes of the physical object and a digital counterpart of the physical object, if one exists.

At block 330, the mobile device transmits the request to a distributed ledger for processing. Transmitting the request to the distributed ledger generally initiates a process for transferring ownership of the physical object from a previous owner to the owner of the mobile device.

At block 340, the mobile device receives a response indicating that the transfer was successful. At block 350, based on the received response, the mobile device adds a digital counterpart of the physical object to a repository associated with an owner of the physical object. The digital counterpart may be added from the information included in the token read from the physical object at block 310, from information included in the response received at block 340, or from information pushed to the mobile device subsequent to receiving the response indicating that the transfer was successful.

Figure 4:
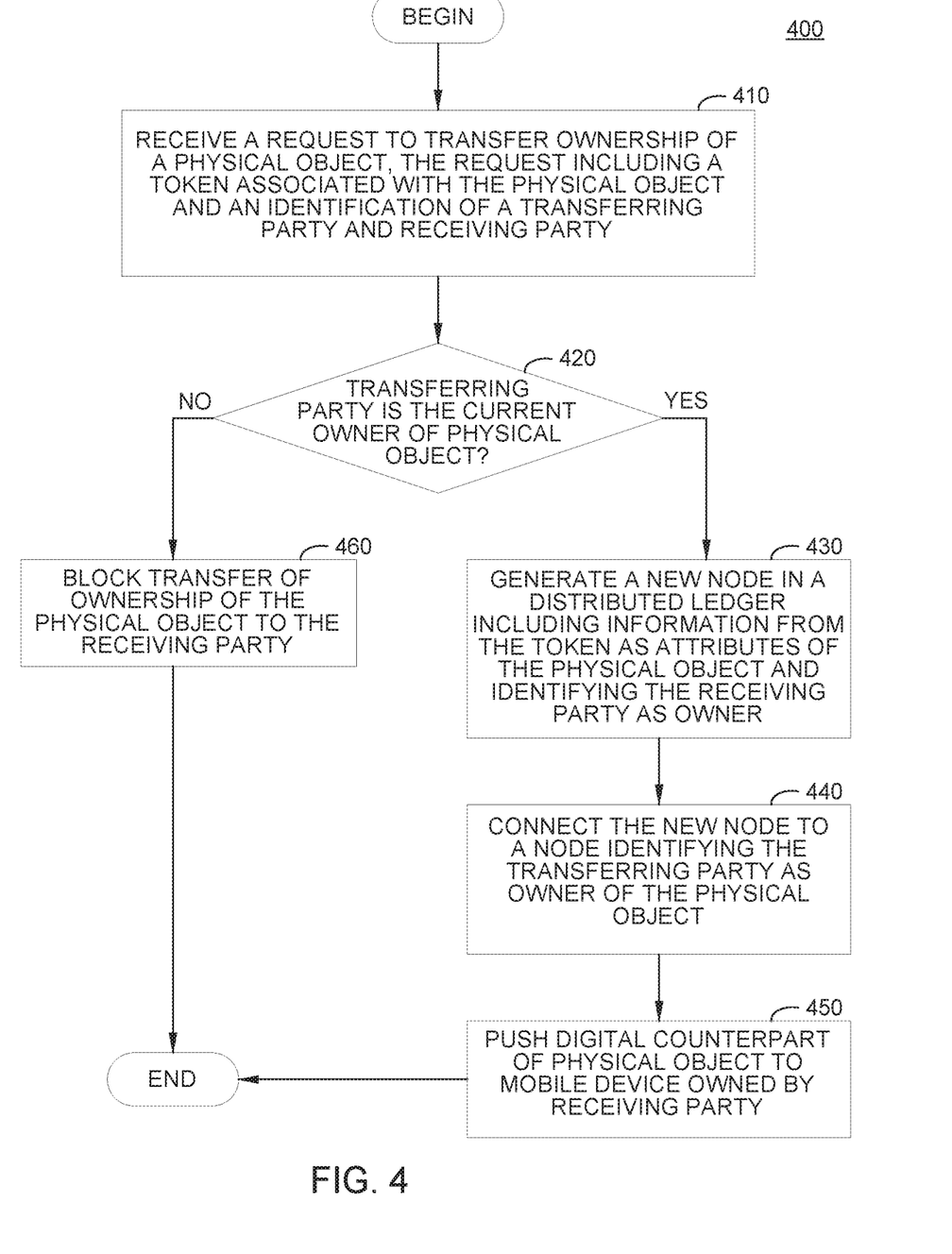
FIG. 4 illustrates example operations for processing a request to transfer ownership of a physical object and a digital counterpart of the physical object between parties, according to one embodiment described herein.

FIG. 4 illustrates example operations that may be performed by a system (e.g., transaction server 130 illustrated in FIG. 1) to process received requests to transfer ownership of a physical object from a transferring party to a receiving party. As illustrated, operations 400 begin at block 410, where the system receives a request to transfer ownership of a physical object. The request may include a token associated with the physical object and information identifying the transferring party and the receiving party.

At block 420, the system determines whether the transferring party is the current owner of the physical object. To determine whether the transferring party is the current owner of the physical object, the system can search the distributed ledger for nodes referencing the physical object identified in the received request. In some embodiments, the system can find an initial node referencing the physical object (e.g., including the unique identifier of the physical object) and can traverse a list of nodes using pointers between nodes until reaching the most recently added node associated with the physical object, which may be a node that does not point to another node. In some embodiments, the system can use a lookup table to identify the most recently added node associated with the physical object. The system extracts information about the owner in the most recently added node, which may be presumed to be the current owner of the physical object, and compares the information about the owner in the most recently added node to the information about the transferring party included in the request.

If the owner in the most recently added node is a match to the transferring party, operations 400 may proceed to block 430, where the system generates a new node in the distributed ledger. The new node generally includes information from the token as attributes of the physical object and identifies the receiving party as the owner of the physical object.

At block 440, the system connects the new node to a node identifying the transferring party as owner of the physical object. The node to which the new node is connected may be the most recently added node identified at block 420.

At block 450, the system pushes the digital counterpart of the physical object to a mobile device owned by the receiving party.

If, at block 420, the system determines that the transferring party is not the current owner of the physical object, operations 400 may proceed to block 460. At block 460, the system blocks the transfer of ownership of the physical object to the receiving party. As discussed, the system may block such a transfer based on an assumption that a mismatch between the current owner of the physical object and the transferring party identified in the request indicates that the transferring party does not actually own the physical object and thus cannot transfer ownership of the physical object to another party. In blocking the transfer of ownership of the physical object, the system can generate an error message indicating the reasons why the transfer was blocked and transmit the error message to one or both of the mobile devices owned by the transferring and receiving parties identified in the request.

Figure 5:
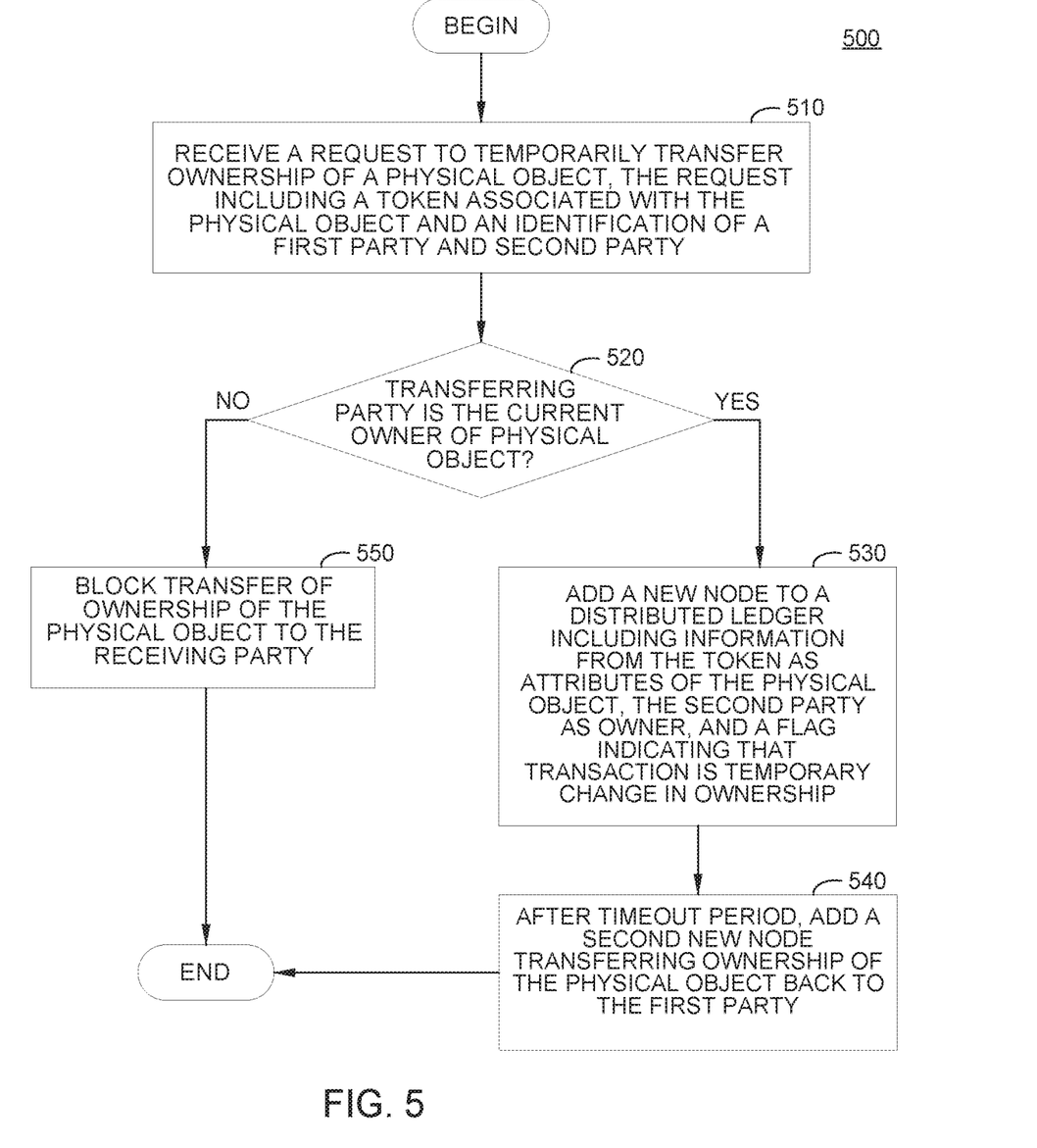
FIG. 5 illustrates example operations for processing a temporary transfer of ownership of a physical object and a digital counterpart of the physical object between parties, according to one embodiment described herein.

FIG. 5 illustrates example operations that may be performed by a system (e.g., transaction server 130) to process a temporary transfer of a physical object and its digital counterpart. As illustrated, operations 500 may begin at block 510, where the system receives a request to temporarily transfer ownership of a physical object. The request may include a token associated with the physical object and information identifying a first party and a second party. The first party may be the party that currently owns the physical object and expects to receive the physical object back at some point in the future, and the second party may be the party that will be borrowing the physical object from the first party. Further, to identify the request as a request to temporarily transfer ownership of a physical object, a temporary transfer flag may be enabled, or a data field in the request may be set to a reserved value to indicate that the transfer is a temporary transfer. In some embodiments, the request may further include information defining the length of the temporary transfer.

At block 520, the system determines whether the first party is the current owner of the physical object, as discussed above.

If, at block 520, the system determines that the first party is the current owner of the physical object, operations 500 may proceed to block 530, where the system adds a new node to a distributed ledger. The new node generally includes information from the token as attributes of the physical object and identifies the second party as the owner of the physical object. Further, the new node may include a flag indicating that the transaction represents a temporary change in ownership.

At block 540, after a timeout period, the system adds a second new node transferring ownership of the physical object back to the first party. The second new node may include information about the digital counterpart of the physical object retrieved from a digital object repository associated with the second party and may identify the first party as the owner of the physical object and its digital counterparts. In some embodiments, the digital counterpart, including any changes made to the digital counterpart by the second party, may be pushed to a mobile device associated with the first party to allow the first party to use the digital counterpart in an application.

If, at block 550, the system determines that the first party is not the current owner of the physical object, operations 500 may proceed to block 550. At block 550, the system blocks the transfer of ownership of the physical object to the second party and can generate an alert or other message to one or both of the mobile devices owned by first and second parties indicating that the transfer failed.

Figure 6:
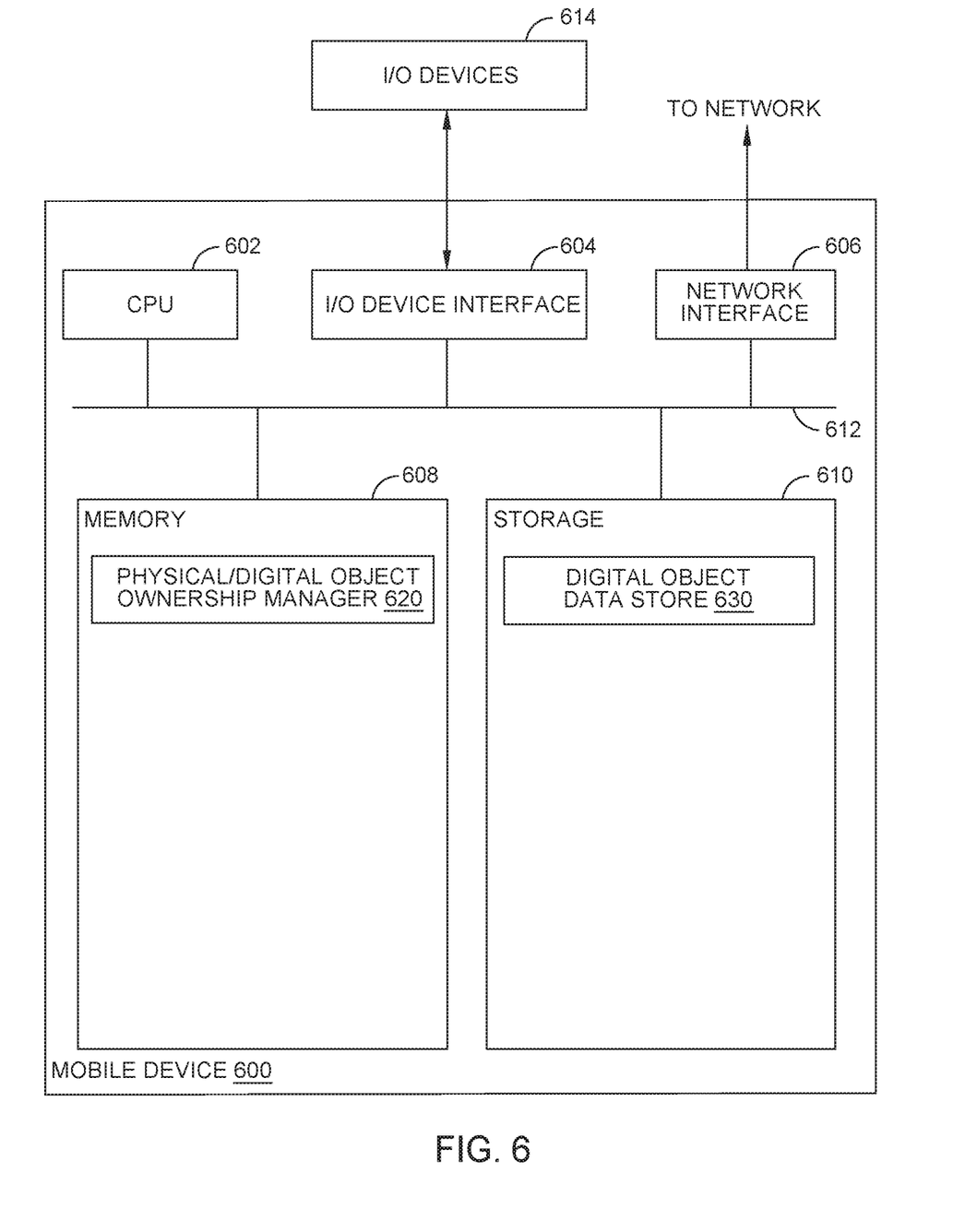
FIG. 6 illustrates an example mobile device on which a transfer of ownership of a physical object can be initiated, according to one embodiment described herein.

FIG. 5 illustrates an example mobile device 500 on which tokens on physical objects may be read to initiate requests to transfer ownership of a physical object and an associated digital counterpart of the physical object from one user to another user. Mobile device 500 may be representative, for example, of mobile device 110 illustrated in FIG. 1.

As illustrated, mobile device 500 includes a central processing unit (CPU) 502, one or more I/O device interfaces 504 that may allow for the connection of various I/O devices 515 (e.g., keyboards, displays, mouse devices, pen input, etc.) to the server 500, network interface 505 through which server 500 is connected to a network (which may be a local network, an intranet, the internet, a personal area network, a device-to-device connection, or any other group of computing devices communicatively connected to each other), a memory 508, storage 510, and an interconnect 512. Network interface 505 may include, for example, one or more low-power wireless transceivers that allows for communications between mobile device 500 and a physical object. These low-power wireless transceivers may allow for communications using, for example, Near Field Communications (NFC), Bluetooth® Low Energy (BLE), and the like.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As illustrated, memory 608 includes a physical/digital object ownership manager 620. Physical/digital object ownership manager 620 generally allows a user of mobile device 600 to initiate a request to transfer ownership of a physical object from a transferring party to a receiving party. To initiate a request, physical/digital object ownership manager 620 can read a token on a physical object via network interface 606 to obtain information about the physical object to be transferred. Physical/digital object ownership manager 620 can generate an ownership transfer request including the token or information extracted from the token and information identifying the transferring and receiving parties and transmit the generated request to a transaction server for processing. In response, physical/digital object ownership manager 620 receives a response indicating whether the transfer was successful. Based on the response, physical/digital object ownership manager 620 can take one or more actions to remove a digital counterpart of a physical object from digital object data store 620 (e.g., where the mobile device 600 is owned or used by the transferring party) or add a digital counterpart of the physical object to object data store 620 (e.g., where the mobile device 600 is owned or used by the receiving party).

Storage 610 is representative of a non-volatile memory, such as a solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). As illustrated, storage 610 includes a digital object data store 630. Digital object data store 630 generally provides a repository in which digital counterparts to physical objects owned by the owner or user of mobile device 600 are maintained. The digital counterparts of physical objects stored in digital object data store 630 may be updated as the digital counterparts are used in various applications, and the contents of digital object data store 630 may be modified as physical objects (and the associated digital counterparts) are transferred between users.

Figure 7:
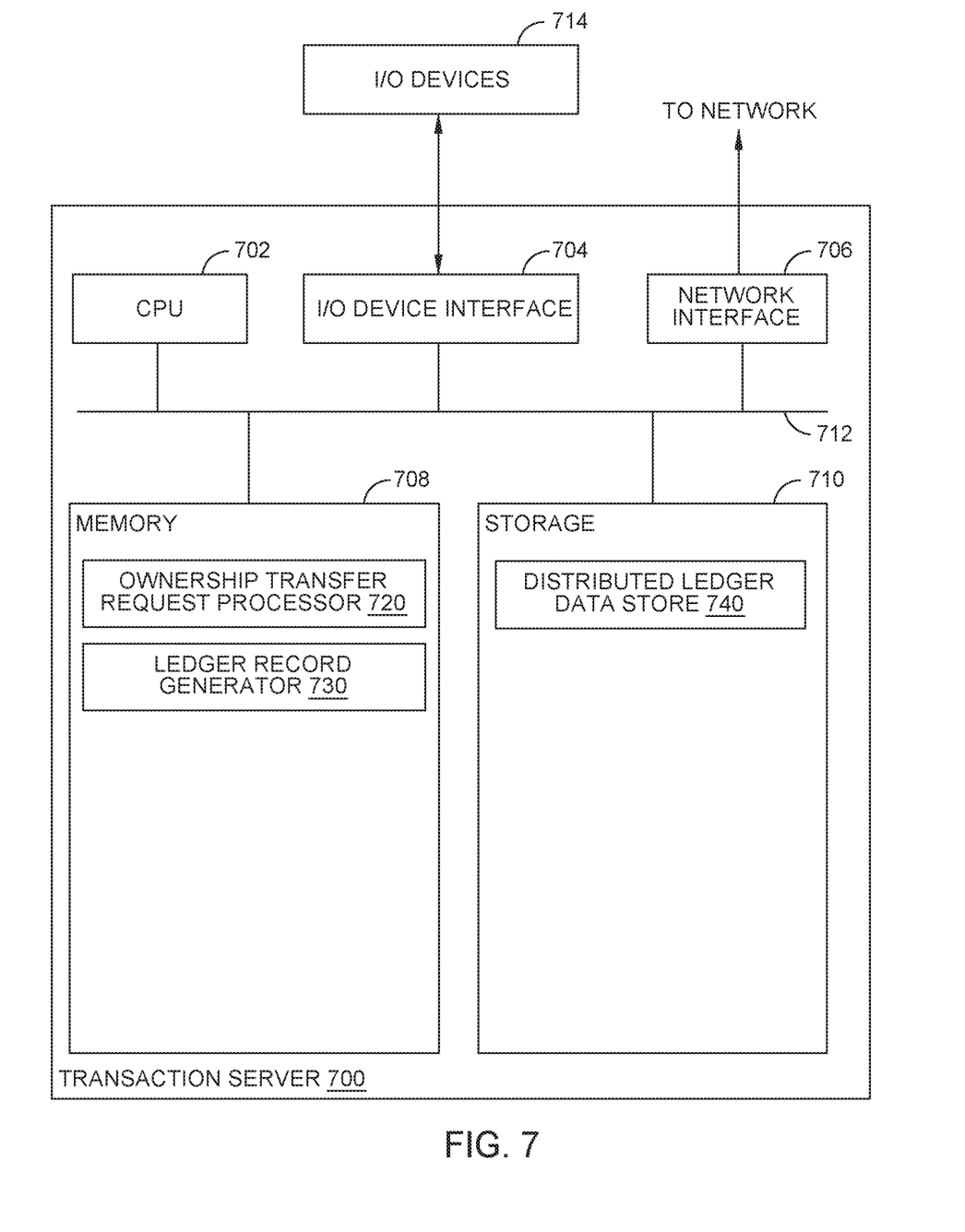
FIG. 7 illustrates an example system for processing requests to transfer ownership of a physical object and a digital counterpart of the physical object between parties, according to one embodiment described herein.

FIG. 7 illustrates an example system 700 that processes requests to transfer ownership of physical objects from a first party to a second party. System 700 may be representative, for example, of transaction server 130 illustrated in FIG. 1.

As illustrated, system 700 includes a central processing unit (CPU) 702, one or more I/O device interfaces 704 that may allow for the connection of various I/O devices 717 (e.g., keyboards, displays, mouse devices, pen input, etc.) to the server 700, network interface 706 through which server 700 is connected to network 790 (which may be a local network, an intranet, the internet, or any other group of computing devices communicatively connected to each other), a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710.

CPU 702 is included to be representative of a single CPU, multiple CPUs, a single CPU having multiple processing cores, and the like.

Memory 708 is representative of a volatile memory, such as a random access memory, or a nonvolatile memory, such as nonvolatile random access memory, phase change random access memory, or the like. As illustrated, memory 708 includes an ownership transfer request processor 720 and a ledger record generator 730. Ownership transfer request processor 720 generally receives requests to transfer ownership of a physical object and its associated digital counterparts from a first party to a second party. In response, ownership transfer request processor 720 determines whether the first party is the current owner of the physical object, as recorded in a distributed ledger, and takes action to process the request based on the determination. If the first party is the current owner of the physical object, ownership transfer request processor 720 can instruct ledger record generator to generate a new record in the distributed ledger to evidence the transfer of ownership from the first party to the second party. Otherwise, ownership transfer request processor 720 can block the transfer from completing.

Ledger record generator 730 generally creates new nodes in a distributed ledger (e.g., stored in distributed ledger data store 740) in response to ownership transfer request processor 720 determining that a transaction may be processed. To create a new node, ledger record generator 730 uses a token included in an ownership transfer request or information extracted from the token, information about the second party in the request, and information about a digital counterpart to populate the data fields of the node. The new node may be connected to the previous node by writing a pointer to the new node in the previous node, thus completing the transfer of ownership from the first party to the second party.

Storage 710 is representative of a non-volatile memory, such as a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN). As illustrated, storage 710

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for managing ownership of physical objects in a distributed ledger by a mobile device, comprising:

reading, via a wireless data connection between a physical object and a mobile device, a token stored on the physical object, the token including at least a unique identifier of the physical object;

generating a request to transfer ownership of the physical object to an owner of the mobile device, the request including the unique identifier of the physical object, wherein generating the request comprises:

extracting one or more properties of the physical object and information about a current state of a digital counterpart to the physical object from the token stored on the physical object, generating a node including the unique identifier of the physical object, the extracted one or more properties of the physical object, and the current state of the digital counterpart to the physical object, and
encapsulating the generated node as payload of a request message to be transmitted to a distributed ledger system;
transmitting the generated request to the distributed ledger system;
receiving a response from the distributed ledger system indicating whether the transfer was successful;
displaying the indication of whether the transfer was successful on the mobile device;
asynchronously receiving a message including the digital counterpart to the physical object, wherein the digital counterpart comprises a digital object with one or more changeable attributes, and wherein the digital object is synchronized with the physical object via the wireless data connection between the physical object and the mobile device;
based on the received message and the indication indicating that the transfer was successful, adding the digital counterpart to the physical object to a repository associated with the owner of the mobile device; and
loading the digital counterpart to the physical object in an interactive environment on the mobile device, wherein the digital counterpart is displayed in the interactive environment based on the one or more changeable attributes, and wherein the one or more changeable attributes are changeable within the interactive environment.

2. The method of claim 1, wherein the wireless data connection between the physical object and the mobile device comprises one of a near field communications (NFC) data connection or a Bluetooth Low Energy (BLE) data connection.

3. The method of claim 1, further comprising:
changing one or more attributes of the digital counterpart to the physical object; and
writing, via the wireless data connection, the changed one or more attributes to the token stored on the physical object.

4. The method of claim 1, further comprising:
receiving an indication that ownership of the physical object has been transferred to another owner; and
in response to receiving the indication, deleting the digital counterpart to the physical object from the repository associated with the owner of the mobile device.

5. The method of claim 1, wherein the request to transfer ownership of the physical object to the owner of the mobile device includes a flag indicating that the transfer is a temporary transfer from an owner of a second mobile device and an indication of a time at which ownership of the physical object is to be returned by the owner of the mobile device to the owner of the second mobile device.

6. The method of claim 5, further comprising:
generating a second request to transfer ownership of the physical object back to the owner of the second mobile device when the indicated time is reached; and
transmitting the generated second request to the distributed ledger system.

7. A method for managing ownership of physical objects in a distributed ledger by a transaction server, comprising:
receiving a request to transfer ownership of a physical object from a first party to a second party, wherein:
the request includes information about a current state of a digital counterpart to the physical object,
the digital counterpart comprises a digital object with one or more changeable attributes,
the digital object is synchronized with the physical object via a wireless data connection between the physical object and a mobile device, and
a payload of the request comprises a node including a unique identifier of the physical object and information about the current state of the digital counterpart to the physical object extracted from a token stored on the physical object;
identifying a node in the distributed ledger representing a latest update to ownership records for the physical object;
comparing an owner identified in the identified node with the first party identified in the received request;
taking one or more actions to transfer ownership of the physical object based on the comparing the owner identified in the identified node with the first party identified in the received request; and
based on transferring ownership of the physical object:
pushing the digital counterpart to the physical object to a second mobile device associated with the second party for inclusion in an interactive environment on the second mobile device associated with the second party, and
transmitting a message to a first mobile device associated with the first party to remove the digital counterpart to the physical object from a repository of the first mobile device.

8. The method of claim 7, wherein:
the comparing results in a determination that the first party matches the owner identified in the identified node; and
the one or more actions comprise:
generating a node in the distributed ledger identifying the second party as owner of the physical object; and
linking the generated node to the identified node, thereby transferring ownership of the physical object to the second party.

9. The method of claim 7, further comprising:
the comparing results in a determination that the first party does not match the owner identified in the identified node; and
the one or more actions comprise blocking transfer of ownership from the first party identified in the request.

10. The method of claim 7, wherein identifying the node in the distributed ledger representing the latest update to ownership records for the physical object comprises:
searching the distributed ledger for an initial ownership record referencing an identifier of the physical object included in the received request; and
traversing a chain of nodes in the distributed ledger starting with the initial ownership record until a node representing an ownership record referencing the identifier of the physical object included in the received request is received that does not point to any other node in the distributed ledger.

11. The method of claim 7, further comprising:
failing to identify a node in the distributed ledger referencing an identifier of the physical object included in the received request;
determining that the physical object associated with the referenced identifier is not an authentic object based on failing to identify a node in the distributed ledger referencing an identifier of the physical object included in the received request; and transmitting a message to a mobile device from which the request was received indicating that the request to transfer ownership of the physical object failed and that authentication of the physical object referenced in the request failed.

12. The method of claim 7, wherein information defining the digital counterpart to the physical object comprises information about an appearance of the digital object in a virtual environment and information about objects in the virtual environment associated with the digital object.

13. The method of claim 12, further comprising:
generating a first node in the distributed ledger identifying the second party as owner of the physical object; and
linking the generated first node to the identified node, thereby transferring ownership of the physical object to the second party.

14. The method of claim 7, wherein the received request includes an indication that a transfer of ownership of the physical object from the first party to the second party is a temporary transfer and an indication of a time at which ownership of the physical object is to be returned to the first party.

15. The method of claim 14, further comprising:
pushing a notification to one or more of a mobile device owned by the second party or a mobile device owned by the first party to read a token on the physical object to return ownership of the physical object;
receiving, from one of the mobile device owned by the second party or the mobile device owned by the first party, a request to return ownership of the physical object to the first party, wherein the request includes information about a digital counterpart to the physical object to also return to the first party;
generating a second node in the distributed ledger identifying the transferring owner as owner of the physical object and including the information about the digital counterpart to the physical object; and
connecting the generated second node to the node, thereby returning ownership of the physical object to the first party.

16. The method of claim 15, further comprising:
pushing the digital counterpart to the physical object to a repository on the mobile device owned by the first party; and
instructing the mobile device owned by the second party to remove the digital counterpart to the physical object from a repository on the mobile device owned by the second party.

17. A system, comprising:
a processor; and
a memory having instructions stored thereon which, when executed by the processor, performs an operation for managing ownership of physical objects in a distributed ledger, the operation comprising:
receiving a request to transfer ownership of a physical object from a first party to a second party, wherein:
the request includes information about a current state of a digital counterpart to the physical object,
the digital counterpart comprises a digital object with one or more changeable attributes,
the digital object is synchronized with the physical object via a wireless data connection between the physical object and a mobile device, and
a payload of the request comprises a node including a unique identifier of the physical object and information about the current state of the digital counterpart to the physical object extracted from a token stored on the physical object;
identifying a node in the distributed ledger representing a latest update to ownership records for the physical object;
comparing an owner identified in the identified node with the first party identified in the received request;
taking one or more actions to transfer ownership of the physical object based on the comparing the owner identified in the identified node with the first party identified in the received request; and
based on transferring ownership of the physical object, pushing the digital counterpart to the physical object to a mobile device associated with the second party for inclusion in an interactive environment on the mobile device associated with the second party.

18. The system of claim 17, wherein:
the received request comprises information about a digital counterpart to the physical object, and
the operation further comprises:
generating a first node in the distributed ledger identifying the second party as owner of the physical object, and
linking the generated first node to the identified node, thereby transferring ownership of the physical object to the second party.

* * * * *